United States Patent [19]
Hall et al.

[11] Patent Number: 4,635,887
[45] Date of Patent: Jan. 13, 1987

[54] ADJUSTABLE MOUNTINGS

[75] Inventors: Kenneth F. Hall; George Chambers, both of Martock, England

[73] Assignee: Martock Design Limited, Martock, England

[21] Appl. No.: 627,830

[22] Filed: Jul. 5, 1984

[51] Int. Cl.⁴ .............................................. G01B 5/00
[52] U.S. Cl. ........................................ 248/179; 248/1; 33/1 M; 33/568; 350/531; 74/479
[58] Field of Search ............... 248/178, 179, 183, 176, 248/913; 108/20, 102, 138, 136, 143; 33/1 M, 568, 573; 269/73; 350/531; 74/479

[56] References Cited

U.S. PATENT DOCUMENTS

| | | | |
|---|---|---|---|
| 3,044,354 | 7/1962 | Brosicke . | |
| 3,870,416 | 3/1975 | Brady | 108/104 |
| 3,990,153 | 11/1976 | Calame | 33/1 M |
| 4,157,818 | 6/1979 | Key | 269/73 |
| 4,520,570 | 6/1985 | Bednorz | 33/1 M |

FOREIGN PATENT DOCUMENTS

| | | | |
|---|---|---|---|
| 1903380 | 7/1970 | Fed. Rep. of Germany | 350/531 |
| 2131908 | 6/1984 | United Kingdom | 74/479 |
| 682751 | 9/1979 | U.S.S.R. | 33/1 M |

OTHER PUBLICATIONS

IBM Technical Disclosure Bulletin, "Frictionless X, Y, Z and Theta Micropositioning Table", May 1973, Aronstein, J.

IBM Technical Disclosure Bulletin, "Step and Repeat Micropositioning Table", Apr. 1970, Rabstejnek, C.

Primary Examiner—J. Franklin Foss
Assistant Examiner—Robert A. Olson
Attorney, Agent, or Firm—Fleit, Jacobson, Cohn & Price

[57] ABSTRACT

A mechanism for imparting very small movements to an object comprises a base and a second base supported therefrom by parallel flexure strips, with a further pair of parallel flexure strips on the second base and supporting a platform for parallel motion at right angles to that of the first base. Of the two parallelograms thus formed one embraces at least part of the structure of the other. A third parallelogram may be formed by a similar structure to one of the first two, so as to provide adjustable movement in a third direction at right angles to each of the first two.

2 Claims, 1 Drawing Figure

U.S. Patent   Jan. 13, 1987   4,635,887
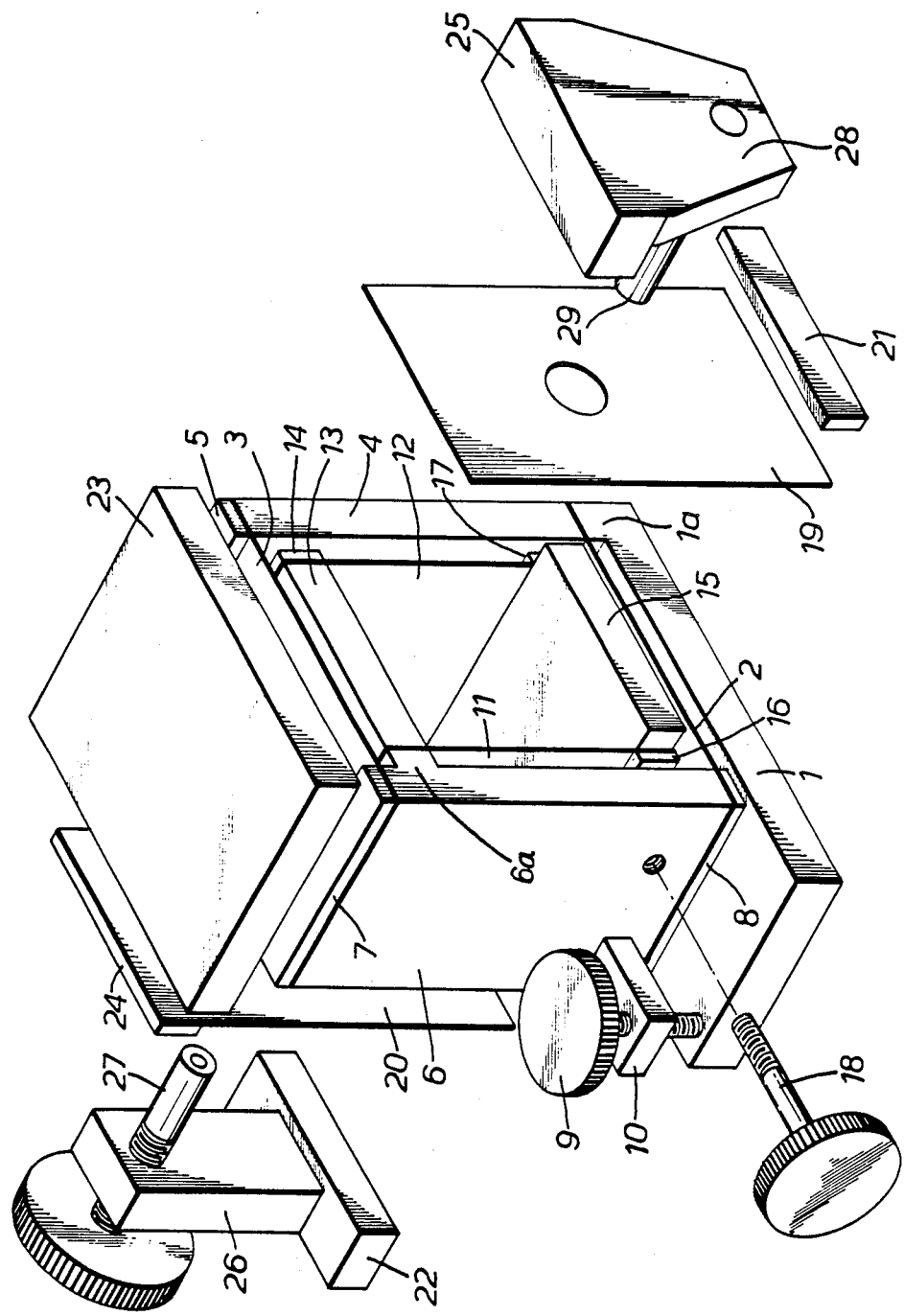

ADJUSTABLE MOUNTINGS

The present invention relates to a mechanism for imparting very small but accurately controlled movements to an object such as a microscope stage or to an optical fibre to align it with another.

Where very small linear movements are needed, friction and static friction should be reduced to a minimum or eliminated. The normal method of obtaining this quality of movement is by the use of rolling bearings, such as the linear ball track. For the finest of movements, defects in the ball track surfaces and geometrical errors in the track assembly result in a movement that is not completely smooth. In addition, the difficulties of assembly can result in a slide system which either has clearance or preloading, neither of which is desirable, and any lubricant used can either contain or collect particles of grit or fibres which will prevent perfect motion. Even with the best systems of this kind, which of course are very expensive, the quality of movement which has now become desirable is not achieved.

Flat strips spring slides have no sliding or rolling surfaces so can have no friction or static friction and they do not require lubrication but have so far not been suitable for effecting complex movements. The invention provides a means of using these to obtain very small precise movements along at least two mutually perpendicular axes in a compact form.

According to the invention an adjustable platform comprises a base, a pair of parallel flap strip springs extending from a face of the base and supporting a second base for parallel motion, and a second pair of parallel flap strip springs extending from a face of the second base and supporting a platform for parallel motion at right angles to the first motion. Preferably one of the parallelograms formed by the base, the second base and the parallel flat strip springs embraces at least part of the structure of the other parallelogram.

Although the flat strip springs are described above as being parallel, it is to be understood that some departure from parallelism can be tolerated as long as the effect is to produce a straight line motion over the distances involved, and indeed the strips may be of unequal length to achieve this end, and in this case the parallograms referred to will in fact be trapeziums. Thus, the above statements and the description which follows, and the claims, are to be interpreted in this sense.

The invention also comprises a structure in which a third base is supported for parallel motion in a third direction from a face of the platform and the parallelogram thus formed embraces part of the structure of at least one of the other parallelograms.

To enable the invention to be clearly understood one form thereof will now be described, by way of example, with reference to the accompanying drawing which is an exploded perspective view of an adjusting mechanism.

In the drawing a base 1 has an upstanding portion 1a to which is attached a flap strip spring 2 which extends back over the base 1 and lies approximately parallel thereto. A further flat strip spring 3 is spaced away from the strip 2 by a spacer 4 and lies parallel to the strip 3. This assembly of components may be held together by rivets or screws (not shown) extending between the portion 1a and a clamping strip 5. Alternatively the parts may be brazed or soldered together.

The free ends of the strips 2 and 3 are used to carry a further base or platform 6 which is held between these free ends by clamping strips 7 and 8 secured as before by rivetting, bolting or brazing. The further base or platform 6 is thus free, subject to the restraint imposed by the elastic modulus of the strips 2 and 3, to move in a direction upwards or downwards in relation to the base 1. This may be termed the X axis. This movement may be occasioned by a suitable thrust mechanism acting between the base 1 and the base or platform 6. In this case it has been shown as a screw 9 threaded into a bracket 10 on the base 6 and acting on the surface of the base 1 to raise the base 6. The strips 2 and 3 may be designed to oppose the thrust of the screw 9 or a separate spring or equivalent may be used.

The base 6 in a similar way to the base 1 has an upstanding portion 6a to which is attached a flat strip spring 11 which extends back over the base 6 and lies approximately parallel thereto. A further flat strip spring 12 is spaced away from the flat strip spring 11 by a spacer 13 and this assembly of parts again may be held together by rivets or screws extending between the portion 6a and a clamping strip 14 or may be brazed or soldered. The free ends of the strips 11 and 12 are used to carry a platform 15 which is held between these free ends by clamping strips 16 and 17, secured as before by rivetting, bolting or brazing. The platform 15 is thus free, subject to the elastic modulus of the strips 11 and 12, to move in a direction at right angles to that of the base 6.

This movement may be occasioned by a suitable thrust exerted between the platform 15 and the base 6, for example by means of a screw 18 threaded into the base 6 and acting on the clamping strip 16 to move the platform 15 to and fro.

It will be seen that an object secured to the platform 15 can now be moved relative to the base 1 over small distances in two directions normal to each other in exceedingly small increments and exceedingly smoothly by operation of the screws 9 and 18. These screws may have hardened spherical ends, provided for example by embedded bearing balls, to enhance the smoothness and accuracy, and if desired the increments of movement may be made even smaller by suitable levers or by using differential thread mechanisms.

It will be observed that the whole of the assembly, other than the operating screws, for enabling movement to take place in the direction of the Y axis is contained within the parallelogram formed by the spacer 4, the strips 2 and 3 and the base 6. This makes for a very compact structure. If more of the surface of the platform 15 is required to be accessible this may be achieved with a slight loss of compactness by arranging the strips 11 and 12 on the sides of an extension of the base 6 occupying a position equivalent to that of the spacer 13, so that they extend upwards and embrace the strip 3. The platform 15 may then be carried as before by the free ends of the strips 11 and 12 but above the strip 3 so that its whole surface is available for mounting an object to be moved. In this case the Y axis is rotated through 90° but is still normal to the X axis.

In some cases it may be necessary for an object to be moved along three axes, and to this end the mechanism shown in the drawing further comprises a pair of flat strip springs 19 and 20 secured to the platform 15, which then acts as a further base, by clamping strips 21 and 22. These strips 19 and 20 extend upwards around the spacer 13 and the strip 3 to carry a platform 23, clamped to them by clamping strips 24 and 25. The strips 19 and 20 each have a central orifice to accept the thrust mechanism for moving the platform 23 relative to the base or platform 15. This mechanism comprises a bracket 26, attached to the strip 22, in which is threaded a screw 27, and a bracket 28, attached to the strip 25 and carrying a thrust block 29. In use, the end of the screw 27 engages the end of the thrust block 29 to move the platform 23 relative to the base 15 along the Z axis. Thus, the platform 23 may be moved along three axes all at right angles to each other by manipulation of the screws 9, 18 and 27.

Again, the structure that results is extremely compact since, for a given minimum length of flat strip spring to achieve a specified performance, the overall dimensions for all three movements are only marginally greater than would be required for a single movement. Moreover, since no friction or static friction is involved, in the actual movable parts, and since the thrust acts against spring pressure, there is no backlash and the mechanism operates with very great smoothness and accuracy.

Although in the example given above screws have been used for adjusting the platform it will be appreciated that other means may be employed for imparting the necessary thrust to the movable parts. For example, electromechanical actuators or stepping motors may be used.

We claim:

1. A micro-positioner comprising:
a first base,
a first bracket extending from and normal to said first base,
a first pair of spaced flat strip springs extending from said first bracket and extending approximately parallel to said first base,
a second base supported by said first pair of spaced flat strip springs for movement approximately normal to said first pair of spaced flat strip springs,
first adjustment means for moving said second base relative to said first base,
a second bracket extending from and normal to said second base, said second bracket being spaced from said first base and extending towards said first bracket,
an open-ended box-like structure defined by said first bracket, said second base and said first pair of spaced flat strip springs,
a second pair of spaced flat strip springs extending from said second bracket and extending approximately parallel to said second base,
a third base supported by said second pair of spaced flat strip springs within said open-ended box-like structure for movement approximately normal to said second base,
second adjustment means for moving said third base relative to said second base,
a third pair of spaced flat strip springs located outside of and covering the open ends of said open-ended box-like structure,
a platform located outside of said open-ended box-like structure and supported by said third pair of spaced flat strip springs for movement approximately parallel to said third base, and
a third adjustment means for adjusting the position of said platform, said third adjustment means being mounted on said third base and on said platform, and extending through apertures defined by said third pair of spaced flat strip springs and extending into said open-ended box-like structure.

2. A micro-positioner according to claim 1, wherein said third adjustment means includes a bracket mounted on said third base and a bracket mounted on said platform, a shaft extends from said bracket mounted on said third base, through an aperture defined by one spring of said third pair of spaced flat strip springs and cooperates with a thrust block which extends from said bracket mounted on said platform and through an aperture defined by the other spring of said third pair of spaced flat strip springs, to effect adjustment of said platform.

* * * * *